(12) United States Patent
Jung et al.

(10) Patent No.: US 10,923,965 B2
(45) Date of Patent: Feb. 16, 2021

(54) SUPPORTER

(71) Applicant: LG INNOTEK CO., LTD., Seoul (KR)

(72) Inventors: Woo Kil Jung, Seoul (KR); Se Hyun Lee, Seoul (KR); Ki Chui Chang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 191 days.

(21) Appl. No.: 16/161,668

(22) Filed: Oct. 16, 2018

(65) Prior Publication Data

US 2019/0089209 A1 Mar. 21, 2019

Related U.S. Application Data

(63) Continuation of application No. 14/478,832, filed on Sep. 5, 2014, now Pat. No. 10,135,304.

(30) Foreign Application Priority Data

Sep. 5, 2013 (KR) .................. 10-2013-0106833
Sep. 5, 2013 (KR) .................. 10-2013-0106834

(51) Int. Cl.
*H02J 50/80* (2016.01)
*H02J 7/00* (2006.01)
*H02J 50/12* (2016.01)
*H02J 50/70* (2016.01)
*H02J 7/02* (2016.01)

(52) U.S. Cl.
CPC ............ *H02J 50/80* (2016.02); *H02J 7/0044* (2013.01); *H02J 7/025* (2013.01); *H02J 50/12* (2016.02); *H02J 50/70* (2016.02)

(58) Field of Classification Search
CPC ........... H02J 7/0044; H02J 50/80; H02J 50/12
USPC ....................................................... 307/104
See application file for complete search history.

(56) References Cited

U.S. PATENT DOCUMENTS

| D243,688 S | 3/1977 | Keyko et al. |
| 4,637,632 A | 1/1987 | Rubash et al. |
| 4,890,580 A | 1/1990 | Owen et al. |
| 5,056,748 A | 10/1991 | Meyer |
| D324,399 S | 3/1992 | Murphy |
| D354,772 S | 1/1995 | Flickinger et al. |
| 5,381,310 A | 1/1995 | Brotz |

(Continued)

FOREIGN PATENT DOCUMENTS

| JP | 2007-104868 | 4/2007 |
| JP | 2013-106428 | 5/2013 |

(Continued)

OTHER PUBLICATIONS

Korean Office Action dated Jul. 29, 2019 issued in Application 10-2013-0106834 (full Korean text).

(Continued)

*Primary Examiner* — Rexford N Barnie
*Assistant Examiner* — Swarna N Chowdhuri
(74) *Attorney, Agent, or Firm* — KED & Associates LLP

(57) ABSTRACT

A supporter includes a housing and a guide member formed at one side of the housing. The guide member has an inclined surface. A fixing member faces the guide member to fix an object and a transmission coil is disposed in the housing to wirelessly transmit power.

18 Claims, 8 Drawing Sheets

(56) References Cited

U.S. PATENT DOCUMENTS

| | | |
|---|---|---|
| 5,466,970 A | 11/1995 | Smithers |
| 5,551,079 A | 8/1996 | Panther et al. |
| D469,803 S | 2/2003 | Goodman et al. |
| 7,062,300 B1 | 6/2006 | Kim |
| D575,826 S | 8/2008 | Chen et al. |
| 7,612,528 B2 | 11/2009 | Baarman et al. |
| 7,868,585 B2 | 1/2011 | Sarnowsky et al. |
| 7,940,024 B2 | 5/2011 | Zhang et al. |
| 8,120,316 B2 | 2/2012 | Sip |
| 8,310,200 B2 | 11/2012 | Matouka et al. |
| 8,373,310 B2 | 2/2013 | Baarman et al. |
| 8,525,471 B2 | 9/2013 | Thorsell et al. |
| 8,624,547 B2 | 1/2014 | Thorsell et al. |
| 8,729,854 B2 | 5/2014 | Tsai et al. |
| 8,783,752 B2 | 7/2014 | Lambert et al. |
| 8,816,636 B2 | 8/2014 | Shinde et al. |
| 8,878,393 B2 | 11/2014 | Kriby et al. |
| 8,890,471 B2 | 11/2014 | Chen |
| 9,018,904 B2 | 4/2015 | Seyerle et al. |
| 9,096,177 B2 | 8/2015 | Boundy et al. |
| 9,124,109 B2 | 9/2015 | Lota et al. |
| 9,142,976 B2 | 9/2015 | Chen |
| 9,148,033 B2 | 9/2015 | Van Wiemeersch |
| 9,167,732 B2 | 10/2015 | Iwanaga et al. |
| 9,191,074 B2 | 11/2015 | Murar |
| 9,368,999 B2 | 6/2016 | Watanabe et al. |
| 9,438,069 B2 | 9/2016 | Hongo |
| 9,455,596 B2 | 9/2016 | Gonzalez Valdez et al. |
| 2004/0129852 A1 | 7/2004 | Giampavolo |
| 2007/0040724 A1 | 2/2007 | Hanahara |
| 2009/0106567 A1 | 4/2009 | Baarman |
| 2009/0186583 A1 | 7/2009 | Seil et al. |
| 2010/0033912 A1 | 2/2010 | Kondou |
| 2011/0255226 A1* | 10/2011 | Duncan Seil .......... F16M 13/02 361/679.01 |
| 2012/0169276 A1* | 7/2012 | Wang .................... H02J 50/40 320/108 |
| 2012/0274282 A1* | 11/2012 | Yoneyama .......... H02J 7/0044 320/115 |
| 2012/0322514 A1 | 12/2012 | Seil et al. |
| 2013/0088195 A1 | 4/2013 | Yoon et al. |
| 2013/0106346 A1 | 5/2013 | Salter et al. |
| 2013/0147426 A1 | 6/2013 | Misono |
| 2013/0154555 A1 | 6/2013 | Miller et al. |
| 2013/0234660 A1* | 9/2013 | Moriguchi .............. H02J 50/10 320/108 |
| 2013/0278207 A1* | 10/2013 | Yoo ........................... H02J 7/02 320/108 |
| 2013/0324198 A1* | 12/2013 | Lachnitt .............. B60R 11/0241 455/575.9 |
| 2014/0139178 A1* | 5/2014 | Large ...................... H02J 50/90 320/108 |
| 2014/0368163 A1 | 12/2014 | Ho |
| 2015/0171649 A1 | 6/2015 | Kim et al. |
| 2015/0373866 A1* | 12/2015 | Scholz ................... F16M 13/00 361/807 |
| 2016/0241289 A1* | 8/2016 | Wieth .................. G07G 1/0081 |

FOREIGN PATENT DOCUMENTS

| | | |
|---|---|---|
| JP | 2013-121251 | 6/2013 |
| KR | 20-0214785 | 2/2001 |
| KR | 20-0408469 | 2/2006 |
| KR | 10-2007-0080057 | 8/2007 |
| KR | 20-0443360 | 2/2009 |
| KR | 10-0967810 | 7/2010 |
| KR | 20-0451879 | 1/2011 |
| KR | 10-1145682 | 5/2012 |
| KR | 20-0467441 | 6/2013 |
| KR | 10-1285084 | 7/2013 |
| KR | 2013-0095906 | 8/2013 |

OTHER PUBLICATIONS

Korean Office Action dated Oct. 3, 2019 issued in Application No. 10-2013-0106833.

Korean Office Action dated Jun. 26, 2017 issued in Application No. 10-2017-0022273.

* cited by examiner

SUPPORTER

CROSS-REFERENCE TO RELATED APPLICATIONS

This application is a Continuation Application of U.S. patent application Ser. No. 14/478,832, filed Sep. 5, 2014, which claims priority under 35 U.S.C. § 119 to Korean Application Nos. 10-2013-0106833, filed Sep. 5, 2013 and 10-2013-0106834, filed Sep. 5, 2013, whose entire disclosures are hereby incorporated by reference.

BACKGROUND

1. Field

The embodiment relates to a supporter capable of supporting and charging an object.

2. Background

Recently, studies and research has been actively conducted on a wireless power transmission (or wireless energy transfer) technique of wirelessly transferring electric energy to a desired device. In order to utilize such a wireless power transmission technique, a transmitter end for transmitting wireless power and a receiver end for receiving wireless power transmitted may be provided.

The transmitter end may be provided in a case (hereinafter, referred to as a supporter) and the receiver end may be provided in a wireless terminal. Thus, the wireless power transmitted from the transmitter end of the supporter is received at the receiver end, such that the wireless terminal is charged.

BRIEF DESCRIPTION OF THE DRAWINGS

The embodiments will be described in detail with reference to the following drawings in which like reference numerals refer to like elements wherein.

DETAILED DESCRIPTION

In the description of embodiments, it will be understood that when one component is referred to as being 'on (above)' or 'under (below)' another component, the terminology of 'on (above)' and 'under (below)' includes both the meanings of 'directly' and 'indirectly'. Further, the meaning of cony and 'under' each layer includes not only an upper direction, but also a lower direction.

Prior to explaining a supporter, a system reflecting the overall system of wireless power transmission will be described.

Figure 1:
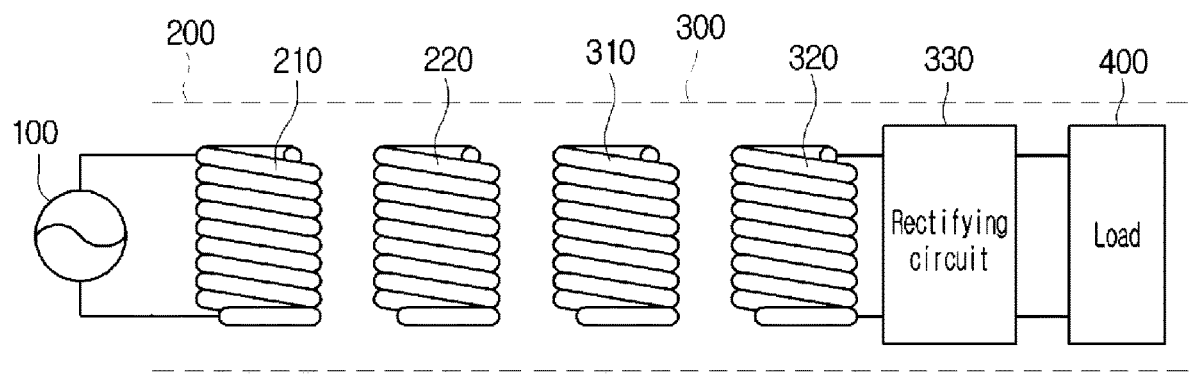
FIG. 1 is a block diagram showing a wireless power transmission system according to an embodiment.

FIG. 1 is a block diagram showing a wireless power transmission system according to an embodiment. Referring to FIG. 1, the wireless power transmission system may include a power source 100, a wireless power transmitter 200, a wireless power receiver 300 and a load 400.

The power source 100 may be included in the wireless power transmitter 200, but the embodiment is not limited thereto. The wireless power transmitter 200 may include a transmission induction coil 210 and a transmission resonant coil 220. The wireless power receiver 300 may include a reception resonant coil 310, a reception induction coil 320 and a rectifying circuit 330. Both terminals of the power source 100 may be connected to both terminals of the transmission induction coil 210.

The transmission resonant coil 220 may be spaced apart from the transmission induction coil 210 by a predetermined distance. The reception resonant coil 310 may be spaced apart from the reception induction coil 320 by a predetermined distance.

Both terminals of the reception induction coil 320 may be connected to both terminals of the rectifying circuit 330, and the load 400 may be connected to both terminals of the rectifying circuit 330. According to an embodiment, the load 400 may be included in the wireless power receiver 300.

The power generated from the power source 100 is transmitted to the wireless power transmitter 200. The power received in the wireless power transmitter 200 is transmitted to the wireless power receiver 300 that makes resonance with the wireless power transmitter 200 due to a resonance phenomenon, that is, has the resonance frequency the same as that of the wireless power transmitter 200.

The power source 100 may generate AC power having a predetermined frequency and may transmit the AC power to the wireless power transmitter 200. The transmission induction coil 210 and the transmission resonant coil 220 may be inductively coupled with each other. In other words, if AC current flows through the transmission induction coil 210 due to the power received from the power source 100, the AC current may be induced to the transmission resonant coil 220 physically spaced apart from the transmission induction coil 210 due to the electromagnetic induction.

Thereafter, the power received in the transmission resonant coil 220 may be transmitted to the wireless power receiver 300, which makes a resonance circuit with the wireless power transmitter 200, through resonance. Power may be transmitted between two LC circuits which are impedance-matched with each other through resonance. The power transmitted through the resonance can be farther transmitted with higher efficiency when comparing with the power transmitted by the electromagnetic induction.

The reception resonant coil 310 may receive power transmitted from the transmission resonant coil 220 through the frequency resonance. The AC current may flow through the reception resonant coil 310 due to the received power. The power received in the reception resonant coil 310 is transmitted to the reception induction coil 320, which is inductively coupled with the reception resonant coil 310, due to the electromagnetic induction. The power received in the reception induction coil 320 may be rectified by the rectifying circuit 330 and transmitted to the load 400.

The transmission induction coil 210, the transmission resonant coil 220, the reception resonant coil 310, and the reception induction coil 320 may have one of spiral and helical structures, but the embodiment is not limited thereto. The transmission induction coil 210 and the reception resonant coil 310 may be resonantly coupled with each other to enable power to be transmitted at a resonance frequency. Since the transmission resonant coil 220 is resonantly coupled with the reception resonant coil 310, the power transmission efficiency between the wireless power transmitter 200 and the wireless power receiver 300 may be significantly improved.

As described above, the wireless power transmission system which transmits power in a resonant frequency scheme has been described. The embodiment may be applied to power transmission of an electromagnetic induction scheme as well as a resonant frequency scheme. According to an embodiment, when the wireless power transmission system transmits power based on electromagnetic induction, the transmission resonant coil 220 included in the wireless power transmitter 200 and the reception resonant coil 310 included in the wireless power receiver 300 may be omitted.

A quality factor and a coupling coefficient are important in the wireless power transmission. That is, the power transmission efficiency may be proportional to each of the quality factor and the coupling coefficient. Thus, as at least one of the quality factor and the coupling coefficient is increased, the power transmission efficiency may be improved. The quality factor may refer to an index of energy that may be stored in the vicinity of the wireless power transmitter 200 or the wireless power receiver 300.

The quality factor may vary according to the operating frequency ω as well as a shape, a dimension and a material of a coil. The quality factor may be expressed as following equation 1:

$$Q=w*L/R \quad \text{[Equation 1]}$$

Where L refers to the inductance of a coil and R refers to resistance corresponding to the quantity of power loss caused in the coil.

The quality factor may have a value of 0 to infinity. When the quality factor has a greater value, the power transmission efficiency between the wireless power transmitter 200 and the wireless power receiver 300 may be more improved.

The coupling coefficient represents the degree of inductive magnetic coupling between a transmission coil and a reception coil, and has a value of 0 to 1. The coupling coefficient may vary according to the relative position and the distance between the transmission coil and the reception coil.

Figure 2:
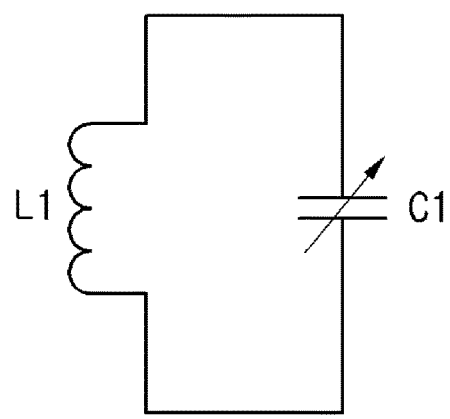
FIG. 2 is an equivalent circuit diagram of the transmission induction coil according to an embodiment.

FIG. 2 is an equivalent circuit diagram of the transmission induction coil according to an embodiment. As shown in FIG. 2, the transmission induction coil 210 may include an inductor L1 and a capacitor C1, and a circuit having a desirable inductance and a desirable capacitance can be constructed by the inductor L1 and the capacitor C1.

The transmission induction coil 210 may be constructed as an equivalent circuit in which both terminals of the inductor L1 are connected to both terminals of the capacitor C1. In other words, the transmission induction coil 210 may be constructed as an equivalent circuit in which the inductor L1 is connected to the capacitor C1 in parallel.

The capacitor C1 may include a variable capacitor, and impedance matching may be performed by adjusting the capacitance of the capacitor C1. The equivalent circuits of the transmission resonant coil 220, the reception resonant coil 310 and the reception induction coil 320 may be equal or similar to the circuit shown in FIG. 2, but the embodiment is not limited thereto.

Figure 3:
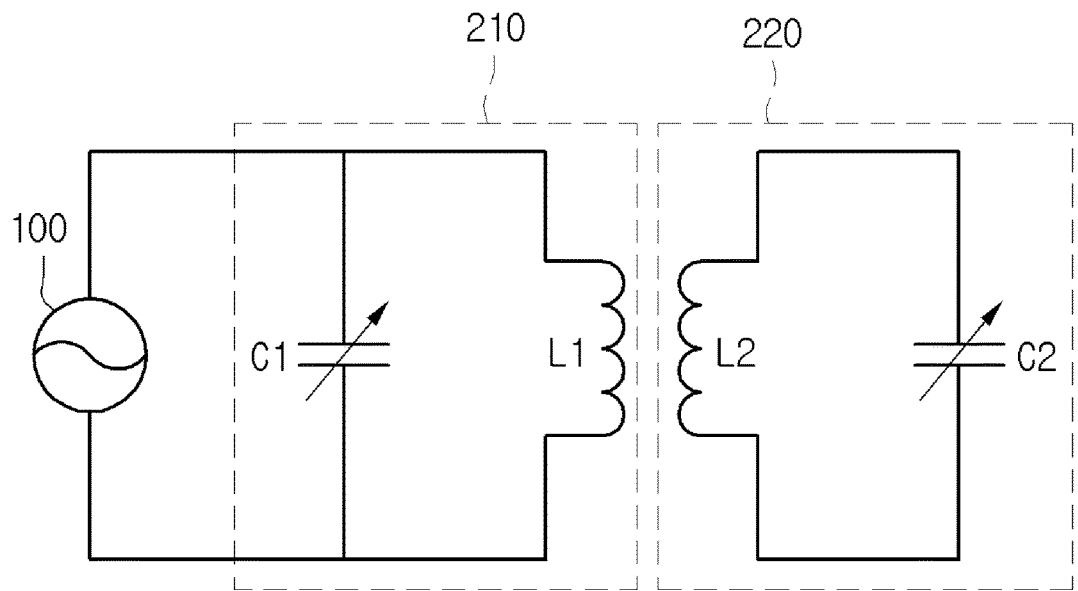
FIG. 3 is an equivalent circuit diagram of the power source and the wireless power transmitter according to an embodiment.

FIG. 3 is an equivalent circuit diagram of the power source and the wireless power transmitter according to an embodiment. As shown in FIG. 3, the transmission induction coil 210 and the transmission resonant coil 220 may be constructed by using inductors L1 and L2 and capacitors C1 and C2 having predetermined inductances and capacitances, respectively.

Figure 4:
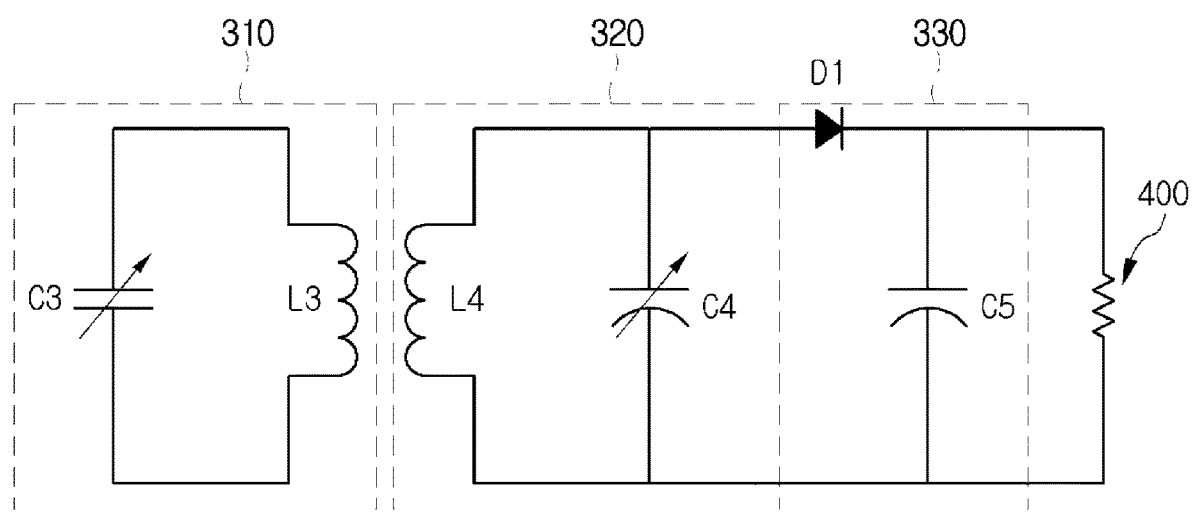
FIG. 4 is an equivalent circuit diagram of the wireless power receiver according to an embodiment.

FIG. 4 is an equivalent circuit diagram of the wireless power receiver according to an embodiment. As shown in FIG. 4, the reception resonant coil 310 and the reception induction coil 320 may be constructed by using inductors L3 and L4, and capacitors C3 and C4 having predetermined inductances and capacitances, respectively.

The rectifying circuit 330 may convert AC power transferred from the reception induction coil 320 into DC power and may transfer the DC power to the load 400. In detail, although not shown, the rectifying circuit 330 may include a rectifier and a smoothing circuit. According to the embodiment, the rectifying circuit may include a silicon rectifier and as shown in FIG. 4, may be equivalent to a diode D1, but the embodiment is not limited thereto. The rectifier may convert AC power transferred from the reception induction coil 320 into DC power.

The smoothing circuit may remove AC components included in the DC power converted by the rectifier to output a smoothed DC power. According to an embodiment, as shown in FIG. 4, a rectifying capacitor C5 may be used as the smoothing circuit, but the embodiment is not limited thereto. The DC power transferred from the rectifying circuit 330 may be DC voltage or current, but the embodiment is not limited thereto.

The load 400 may be an arbitrary rechargeable battery or a device requiring the DC power. For example, the load 400 may refer to a battery. The wireless power receiver 300 and the load 400 may be included in a wireless terminal 5 or an electronic apparatus.

For example, the wireless terminal 5 may include a smart phone or a tablet PC. The electronic apparatus may be a device, such as a mouse or a keyboard, requiring charged power. Thus, the reception resonant coil 310 and the reception induction coil 320 may have shapes corresponding to the shape of an electronic appliance.

The wireless power transmitter 200 may exchange information with the wireless power receiver 300 through in-band or out-of-band communication. The in-band communication may refer to the communication for exchanging information between the wireless power transmitter 200 and the wireless power receiver 300 by using a signal having a frequency used in the wireless power transmission. To this end, the wireless power receiver 300 may further include a switch and may receive the power transmitted from the wireless power transmitter 200 through a switching operation of the switch or not. Thus, the wireless power transmitter 200 detects an amount of power consumed in the wireless power transmitter 200, so that the wireless power transmitter 200 may recognize an on or off signal of the switch included therein.

In detail, the wireless power receiver 300 may change an amount of power dissipated in a resistor by using the resistor and a switch, so that the power consumed in the wireless power transmitter 200 may be changed. The wireless power transmitter 200 may sense a change of the consumed power to obtain information about a state of the wireless power receiver 300. The switch and the resistor may be connected in series to each other. The information about a state of the wireless power receiver 300 may include information about a current charged amount and/or the change of charged amount of the wireless power receiver 300.

When the switch is opened, the power dissipated in the resistor is 0 (zero) and the power consumed in the wireless power transmitter 200 is also reduced. If the switch is shorted, the power absorbed in the resistor is more than 0 and the power consumed in the wireless power transmitter 200 is increased. While the wireless power receiver repeats the above operation, the wireless power transmitter 200 may detect the power consumed in the wireless power transmitter 200 and may perform digital communication with the wireless power receiver 300.

The wireless power transmitter 200 receives the information about the state of the wireless power receiver 300 according to the above operation, so that the wireless power transmitter 200 may transmit the power suitable to the reception state of the wireless power receiver 300.

To the contrary, the wireless power transmitter 200 may include a resistor and a switch to transmit the information about the state of the wireless power transmitter 200 to the wireless power receiver 300. According to one embodiment, the information about the state of the wireless power transmitter 200 may include information about the maximum amount of power to be supplied from the wireless power transmitter 200, the number of wireless power receivers 300 receiving the power from the wireless power transmitter 200 and the amount of available power of the wireless power transmitter 200.

The out-of-band communication refers to the communication performed through a specific frequency band other than the resonance frequency band in order to exchange information necessary for the power transmission. The wireless power transmitter 200 and the wireless power receiver 300 can be equipped with out-of-band communication modules to exchange information necessary for the power transmission. The out-of-band communication module may be installed in the power supply device. In one embodiment, the out-of-band communication module may use a short-distance communication technology, such as Bluetooth, Zig-Bee, WLAN or NFC, but the embodiment is not limited thereto.

Figure 5:
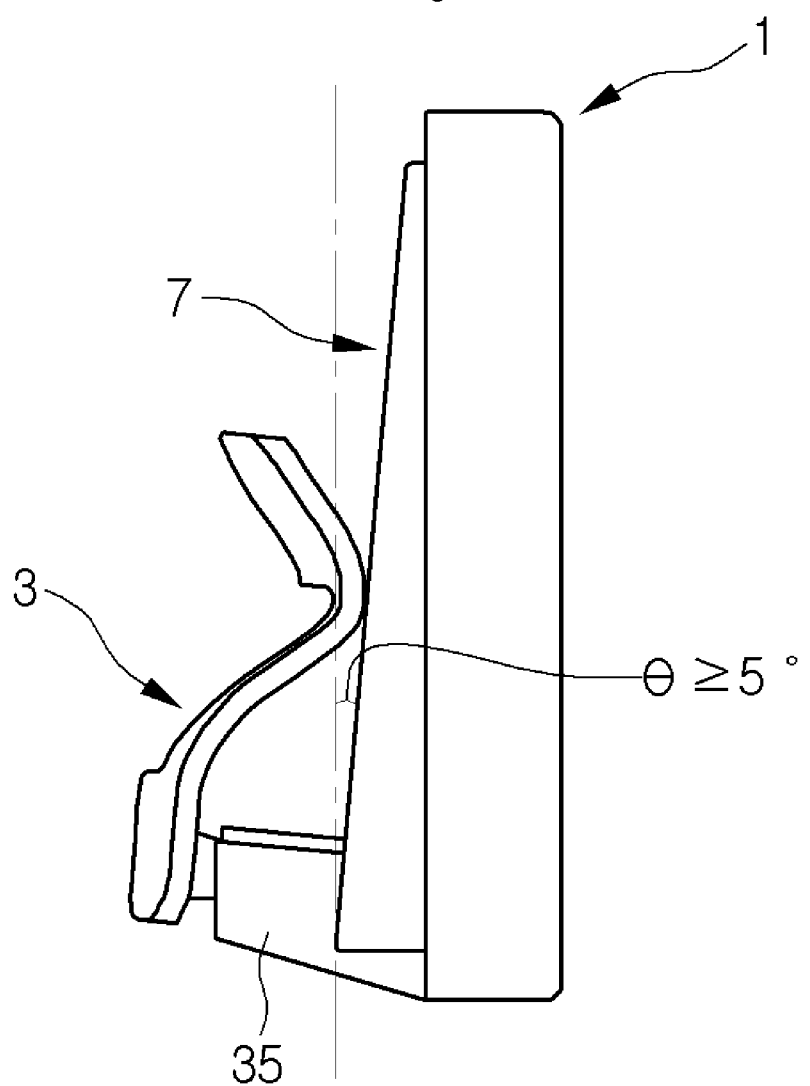
FIG. 5 is a side perspective view showing a wireless terminal supporter according to the embodiment.
Figure 6:
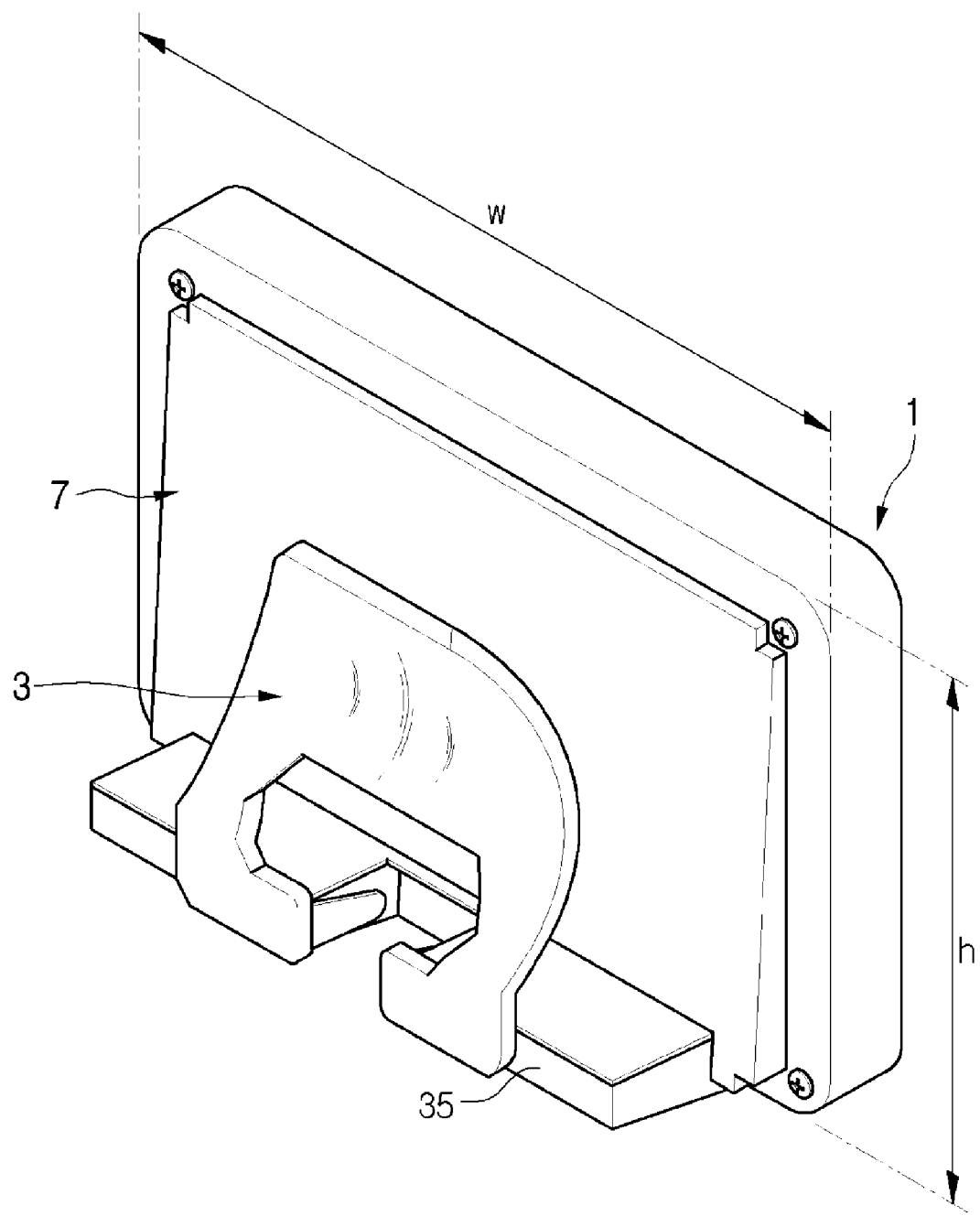
FIG. 6 is a front perspective view showing a wireless terminal supporter according to the embodiment.

FIG. 5 is a side perspective view showing a wireless terminal supporter according to the embodiment. FIG. 6 is a front perspective view showing a wireless terminal supporter according to the embodiment. Referring to FIGS. 5 and 6, the wireless terminal supporter may include a housing 1 and a fixing member 3. Although the embodiment is described while focusing on a wireless terminal supporter, the supporter of the embodiment may be applied to various objects to be supported and charged. For example, the object may include a battery, an electronic appliance and a home appliance which are required to be supported and charged, as well as a wireless terminal.

The housing 1 may have a rectangular shape when viewed at a front side thereof, but the embodiment is not limited thereto. The wireless terminal 5 may have a rectangular shape and a round-shaped edge, but the embodiment is not limited thereto. Thus, the wireless terminal 5 may have a wide width and a narrow width. A height h of the housing 1 may be at least longer than the narrow width of the wireless terminal 5 and a width w of the housing 1 may be at least wider than the wide width of the wireless terminal 5, but the embodiment is not limited thereto.

The power source 100 and the wireless power transmitter 200 shown in FIGS. 1 to 4 may be included in the wireless terminal supporter. The power source 100 and the wireless power transmitter 200 may be installed in the housing 1. The wireless power receiver 300 and the load 400 shown in FIGS. 1 to 4 may be installed in the wireless terminal 5.

Wireless power may be transmitted through the power source 100 and the wireless power transmitter 200 of the wireless terminal supporter. In this case, when the wireless terminal 5 approaches the wireless terminal supporter in a distance at which the wireless terminal 5 can receive the wireless power, the wireless power provided from the wireless power transmitter 300 may be received by the wireless power receiver 300 of the wireless terminal 5 so that the wireless power may be provided to the load 400. The load 400 may be a chargeable device such as a battery of the wireless terminal 5.

A guide member 7 may be disposed to face the fixing member 3. The guide member 7 may be formed on a front surface of the housing 1 facing the fixing member 3. The guide member 7 may have an inclined surface inclined at 5° or more about a normal line, but the embodiment is not limited thereto.

Since the wireless terminal 5 and the guide member 7 of the housing facing each other make contact with each other, the wireless terminal 5 may be inclined at 5° or more about a normal line. Since the wireless terminal 5 is stably maintained by the guide member 7 of the housing 1, the wireless terminal 5 is not shaken.

Although not shown, an absorption member is formed on a surface of the guide member 7 of the housing 1 making contact with the wireless terminal 5, so that the wireless terminal 5 placed on the guide member 7 may be stably maintained without any shake. For example, the absorption member may be formed of a resin material or a plastic material, but the embodiment is not limited thereto. For example, a plurality of protrusions may be formed on the surface of the absorption member through an embossing process, but the embodiment is not limited thereto.

Figure 7:
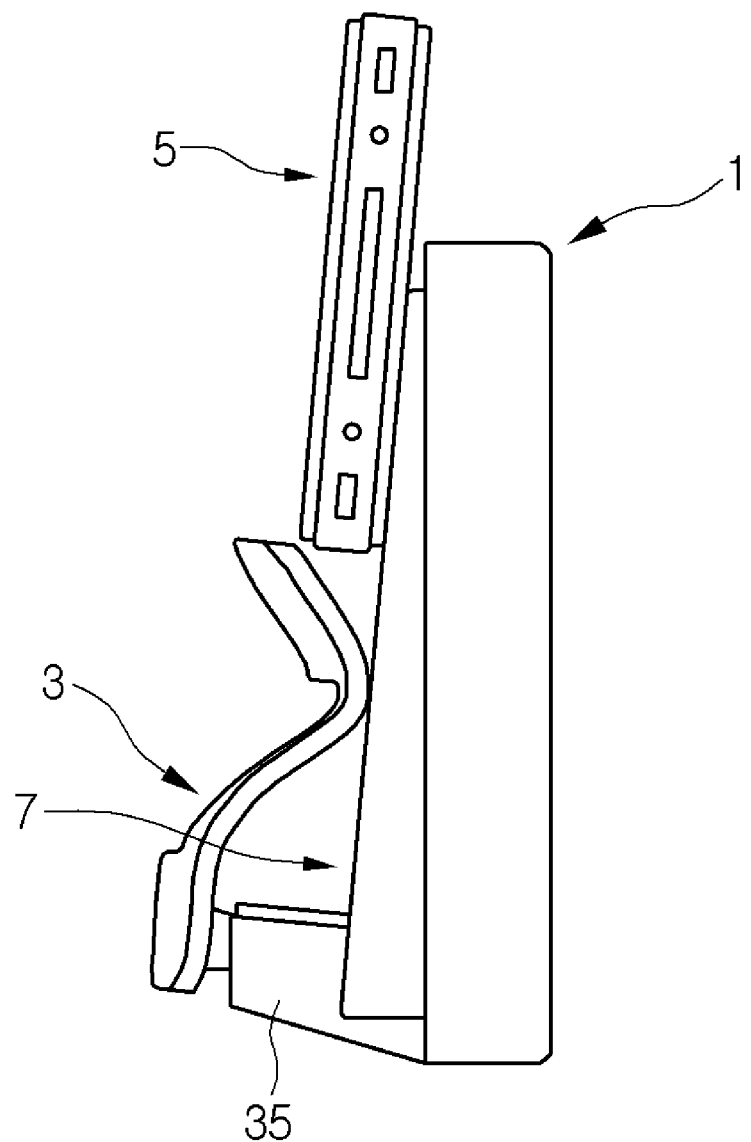
FIG. 7 is a side perspective view showing a wireless terminal being inserted into a wireless terminal supporter according to the embodiment.

In addition, in order to more firmly fix the wireless terminal 5, the fixing member 3 may be used. At least one portion of the fixing member 3 may basically make contact with the guide member 7 of the housing 1. As shown in FIG. 7, if the wireless terminal 5 is inserted between the fixing member 3 and the guide member 7 of the housing 1, the wireless terminal 5 may fall downwardly between the guide member 7 of the housing 1 and the fixing member 3 while the fixing member 3 is pushed away from the guide member 7 of the housing 1.

Figure 8:
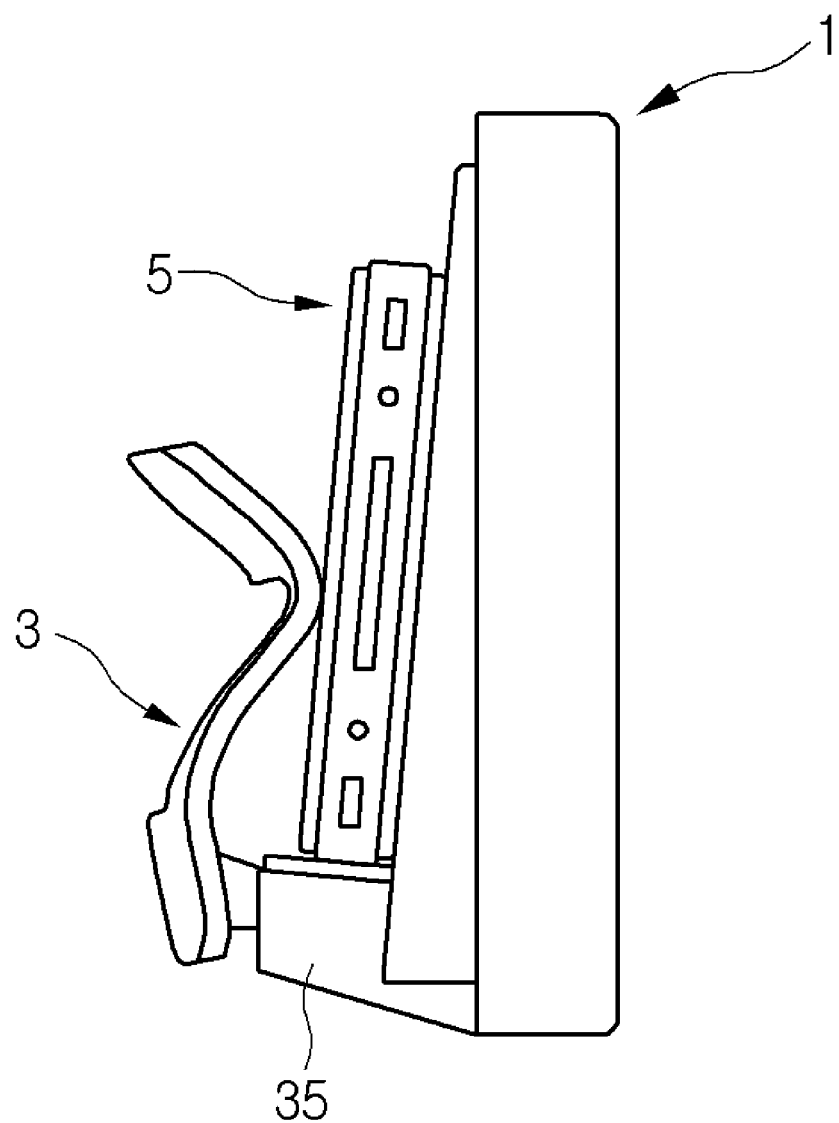
FIG. 8 is a side perspective view showing a wireless terminal that has been inserted into a wireless terminal supporter according to the embodiment.
Figure 9:
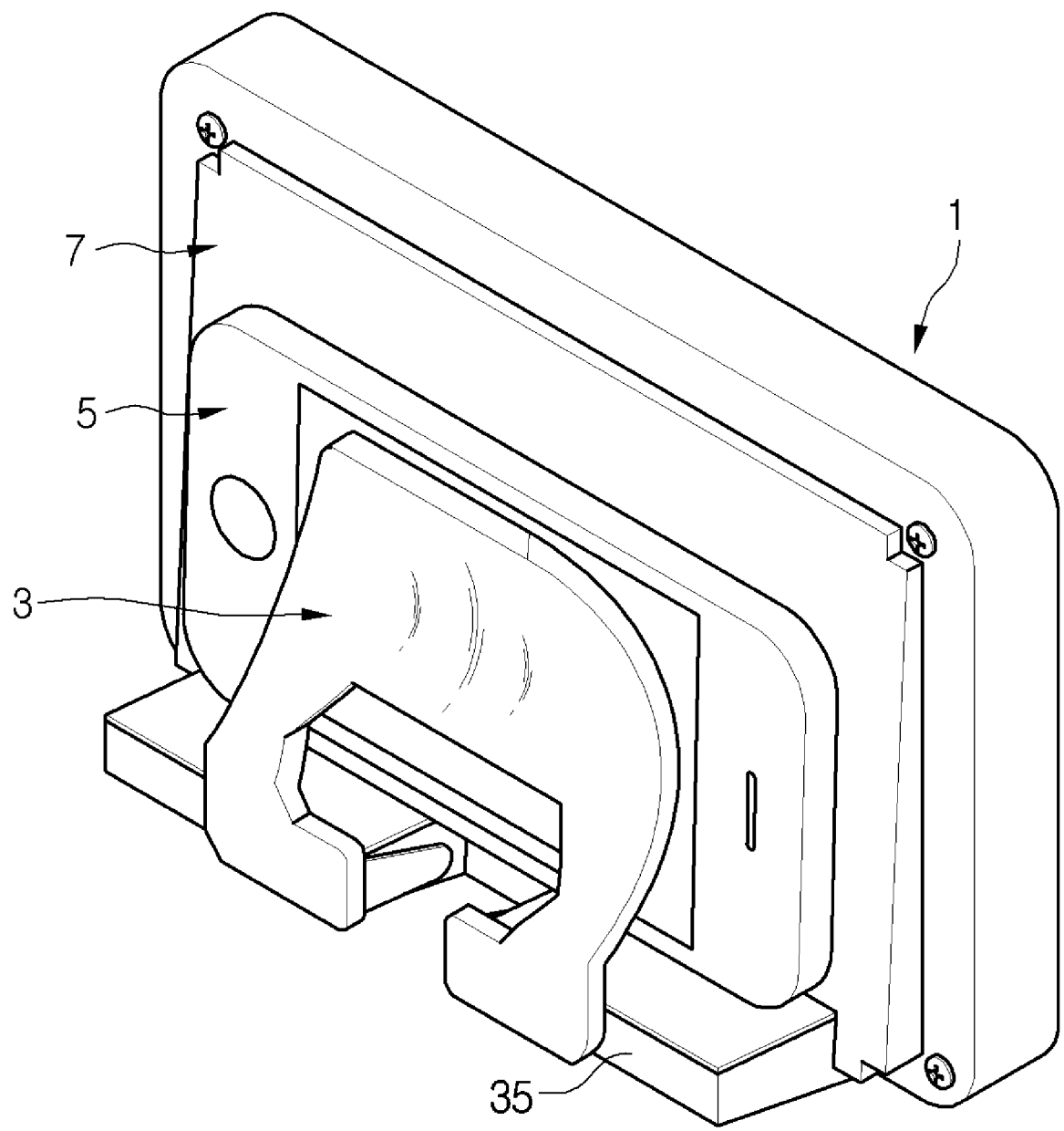
FIG. 9 is a front perspective view showing a wireless terminal that has been inserted into a wireless terminal supporter according to the embodiment.

As shown in FIGS. 8 and 9, the wireless terminal 5 that falls downward may be securely mounted on a secure member 35 of the housing 1. A shape formed by the guide member 7 and the secure member 35 may correspond to a shape formed by rear and side surfaces of the wireless terminal 5. That is, when the rear and side surfaces of the wireless terminal 5 has a vertical shape, the secure member 35, that is, a top surface of the secure member 35 may be perpendicular to the guide member 7. The wireless terminal 5 may be stably maintained and fixed without any shake due to the inclination of the guide member 7, the secure member 35 and the fixing member 3.

When wireless power is provided from the wireless power receiver 200 installed in the housing 1 to the wireless terminal 5 securely mounted on the secure member 35 of the housing 1, the wireless power is received by the wireless power receiver 300 installed in the wireless terminal 5 and is provided to the load 400, so that the load 400, that is, the battery may be charged.

If the wireless power receiver 300 is included in the battery, the battery instead of the wireless terminal 5 is directly mounted on the secure member 35 of the housing 1 such that the battery may be charged. According to the embodiment, not only the battery, but also the wireless terminal 5 equipped with the battery can be mounted and charged.

As described above, at least one of the quality factor and the coupling coefficient must be increased to improve the power transmission efficiency between the wireless power transmitter 200 and the wireless power receiver 300. Although several conditions may be set to improve the power transmission efficiency, the transmission coil 210 or 210 and 220 of the wireless power transmitter 200 must face the reception coil 320 or 310 and 320 in parallel with each other. The transmission coil 210 or 210 and 220 of the wireless power transmitter 200 installed in the housing 1 may be disposed in parallel with the guide member 7 of the housing 1.

Figure 10:
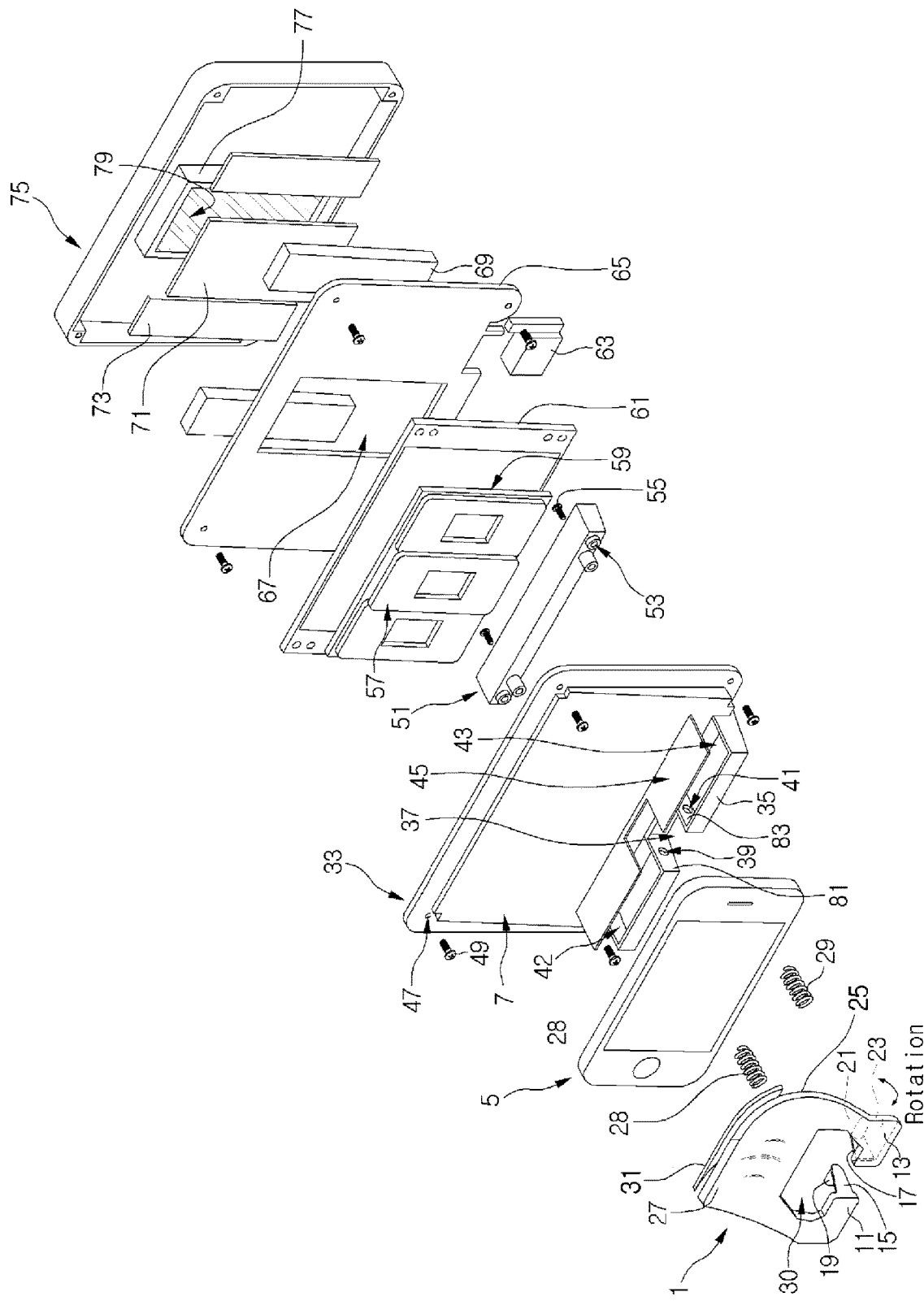
FIG. 10 is an exploded perspective view showing a wireless terminal supporter according to the embodiment.

FIG. 10 is an exploded perspective view showing a wireless terminal supporter according to the embodiment. Referring to FIG. 10, the wireless terminal supporter according to the embodiment may include a housing 1 and a fixing member 3.

The housing 1 may include a first case 33 and a second case 75 coupled to the first case 33. The first case 33 may include a secure member 35 formed in a lower portion thereof and a guide member 7 inclined to the secure member 35. The secure member 35 and the guide member 7 may be formed integrally with each other through a molding process, but the embodiment is not limited thereto. A rear surface of the wireless terminal 5 may lean against the guide member 7 and may be securely mounted on the secure member 35.

A buffer member 45 may be disposed on the secure member 35. That is, the buffer member 45 may be attached to a top surface of the secure member 35. When the buffer member 45 is securely mounted on the buffer member 45, the buffer member 45 prevents the wireless terminal 5 from sliding so that the wireless terminal 5 may be prevented from shaking. The buffer member 45 may be formed of a resin material such as epoxy having elasticity or a rubber material, the embodiment is not limited thereto.

A plurality of grooves may be formed on the top surface of the buffer member 45, for example, in one direction, but the embodiment is not limited thereto. The grooves or protrusions may further restrain the wireless terminal 5 from shaking. The buffer member 45 may have a shape corresponding to a shape of a top surface of the secure member 35, but the embodiment is not limited thereto.

A first recess 37 may be provided in a central portion of the secure member 35. The first recess 37 may have a shape recessed from one side surface of the secure member 35 toward the guide member 7. The secure member 35 may include second and third recesses 42 and 43 formed at both sides of the first recess 37. The second and third recesses 42 and 43 may have the shapes recessed downwardly.

The secure member 35 may include a first side wall 81 disposed in the first and second recesses 37 and 42 and a second side wall 83 disposed in the first and third recesses 37 and 43. First and second holes 39 and 41 may be formed on the first and second side walls 81 and 83, respectively.

The first recess 37 may communicate with the second and third recesses 42 and 43 through the first and second holes 39 and 41.

A recess having a shape equal to that of the first recess 37 of the secure member 35 may be formed at the center of the buffer member 45. As the buffer member 45 is attached to the secure member 35, upper portions of the second and third recesses 42 and 43 of the secure member 35 may be closed.

The fixing member 3 is connected to the secure member 35 such that the fixing member may rotatably move. The fixing member 3 may include first and second supports 11 and 13, first and second rotation shafts 19 and 21, a pressing part 25 and an inlet part 27. The pressing part 25 may extend from the first and second supports 11 and 13. In other words, the first and second supports 11 and 13 may be branched from the pressing part 25. Thus, an opening 30 may be formed by the pressing part 25 and the first and second supports 11 and 13.

For example, the first and second supports 11 and 13 branched from the pressing part 25 may be gradually spaced apart from each other in the downward direction and then gradually closed to each other. Due to such a shape, the strength of the fixing member 3 is fully concentrated on the wireless terminal 5 so that the wireless terminal 5 may be firmly fixed, and the contact area of the pressing part 25 and the first and second supports 11 and 13 with respect to the wireless terminal 5 may be maximized so that the wireless terminal 5 may be securely fixed.

An interval between low portions of the first and second supports 11 and 13 may be less than a diameter of the opening 30. The interval between low portions of the first and second supports 11 and 13 may be less than a width of the first recess 37 of the secure member 35, that is, an interval between the first and second side walls 81 and 83. Thus, first and second connecting members 15 and 17, which extend from the low portions of the first and second supports 11 and 13, may be inserted into the first recess 37 between the first and second side walls 81 and 83 of the secure member 35.

The first and second connecting members 15 and 17 may extend from the first and second supports 11 and 13 toward the guide member 7. The first and second connecting members 15 and 17 may allow the first and second rotation shafts 19 and 21 to be connected to the first and second connecting members 15 and 17, respectively. That is, the first connecting member 15 may extend from the first support 11 and the first rotation shaft 19 may extend from the first connecting member 15. The second connecting member 17 may extend from the second support 13 and the second rotation shaft 21 may extend from the second connecting member 17.

The first and second rotation shafts 19 and 21 may extend from one ends of the first and second connecting members 15 and 17 such that the first and second rotation shafts 19 and 21 are gradually spaced apart from each other. For example, the first rotation shaft 19 may extend from one end of the first connecting member 15 in the left direction when viewed at a front side, and the second rotation shaft 21 may extend from one end of the second connecting member 17 in the right direction.

The rotation shaft 19 may extend into the second recess 42 such that the first rotation shaft 19 passes through the first hole 39 formed in the first side wall 81 of the secure member 35. The second rotation shaft 21 may extend into the third recess 43 such that the second rotation shaft 21 passes through the second hole 41 formed in the second side wall 83 of the secure member 35.

First and second contact parts 23 may extend from each of the first and second rotation shafts 19 and 21. The first and second contact parts 23 may extend downwardly from one ends of the first and second rotation shafts 19 and 21, respectively, but the embodiment is not limited thereto.

First and second contact parts 23 make contact with first and second elastic members 28 and 29 so that the first and second contact parts 23 are always subject to restoring force by the first and second elastic members 28 and 29, so the first and second contact parts 23 may tend to move away from the guide member 7. The first and second elastic members 28 and 29 may be springs, but the embodiment is not limited thereto.

When the first and second contact parts 23 moves away from the guide member 7 due to the restoring force so that the first and second rotation shafts 19 and 21 are rotated clockwise, the first and second supports 11 and 13, the pressing part 25 and the inlet part 27, which are connected to the first and second rotation shafts 19 and 21, may move in the direction opposite to the first and second contact parts 23, that is, toward the guide member 7.

If the wireless terminal 5 is inserted between the guide member 7 and the inlet part 27, the inlet part 27 may move away from the guide member 7 by the wireless terminal 5. When the first and second rotation shafts 19 and 21 are rotated counterclockwise as the inlet part 27 moves, the first and second contact parts 23 connected to the first and second rotation shafts 19 and 21 is forcibly moved to approach the guide member 7, so that the first and second elastic members 28 and 29 may be compressed by each of the first and second contact parts 23. However, since the restoring force is still applied to the first and second contact parts 23 by the first and second elastic members 28 and 29, torque that allows the first and second rotation shafts 19 and 21 to be rotated clockwise is generated and is mostly transferred to the first and second supports 11 and 13, the pressing part 25 and the inlet part 27, so that the first and second supports 11 and 13, the pressing part 25 and the inlet part 27 (specifically, the pressing part 25) may press a part of the top surface of the wireless terminal 5 and the pressing state may continue until the wireless terminal 5 is detached from the housing 1.

The inlet part 27 is disposed to face the guide member 7. As the inlet part 27 moves upwardly, the inlet part 27 may move to be away from the guide member 7. In other words, the inlet part 27 may extend from the pressing part 25 and may be bent to be gradually away from the guide member 7.

The fixing member 3 may include the buffer member 31 for preventing a scratch which may be generated when the fixing member 3 makes contact with the wireless terminal 5. The buffer member 31 may be attached to an inside surface of the fixing member 3. In detail, the buffer member 31 may be attached at least to an inside surface of the pressing part 25. The buffer member 31 may be attached onto the entire region of the pressing part 25 and a region of the inlet part 27. The buffer member 31 may include one of a resin material, a rubber material and a plastic material, but the embodiment is not limited thereto.

A printed circuit board 65, a heat sink 61 and a transmission coil 210 or 210 and 220 may be disposed between the first and second cases 33 and 75. An electronic device 69 such as a power source 100 or a control unit may be mounted on the printed circuit substrate 65.

The electronic device 69 may be disposed on a rear surface of the printed circuit substrate 65 such that the electronic device 69 faces an inner surface of the second case 75. As the electronic device 69 is disposed as described above, an effect of a magnetic field generated from the transmission coil 210 or 210 and 220 may be minimized. In addition, as the electronic device 69 is disposed as described above, the heat sink 61 and the printed circuit board 65 make contact with each other, such that the heat generated from the transmission coil 210 or 210 and 220 and transferred to the heat sink 61 may be transferred to the printed circuit board 65, thereby improving the thermal dissipation efficiency.

The wireless power transmitter 200 may be configured with the control unit and the transmission coil 210 or 210 and 220. The power source 100 may be included in the wireless power transmitter 200.

The control unit may control the entire wireless power transmission. For example, the control unit may adjust a quantity of wireless power to be transmitted to the wireless power receiver 300 provided to the wireless terminal 5, may process a follow-up action based on information about a charged state of the wireless power receiver 300, or may control wireless communication between the wireless transmitter 200 and the wireless power receiver 300, but the embodiment is not limited thereto.

The printed circuit board 65 may include at least one opening 67. For example, the opening 67 may be formed at a center of the printed circuit board 65, but the embodiment is not limited thereto. The size of the opening 67 may be equal to or greater than that of the protrusion member 77 of the second case 75 which will be described below, the embodiment is not limited thereto. The size of the opening 67 may vary with the size of the protrusion member 77.

The opening 67 may have a rectangular shape, but the embodiment is not limited thereto. At least one opening 67 formed in the printed circuit board 65 may have mutually different sizes and/or shapes.

The electronic device 69 may be mounted on the printed circuit board 65 except for the opening 67. A connector 63 may be connected to one side of the printed circuit board 65. The connector 63 may transfer a signal from an outside to the electronic device 69 or a signal from the electronic device 69 to an outside.

The transmission coil 210 or 210 and 220 may be disposed on the top surface of the printed circuit board 65. The transmission coil 210 or 210 and 220 may generate wireless power to transmit the wireless power to the wireless terminal 5. As described above, the wireless power transmission scheme may include an electromagnetic induction scheme and resonant frequency scheme.

A magnetic substrate 59 may be disposed between the printed circuit substrate 65 and the transmission coil 210 or 210 and 220. The magnetic substrate 59 may include a magnetic substance of a ferrite, but the embodiment is not limited thereto. The magnetic substrate 59 may be a magnetic substance in itself or may include a substrate and a magnetic substance disposed on the substrate. The magnetic substrate 59 may prevent the magnetic field generated from the transmission coil 210 or 210 and 220 from exerting an influence on an electronic device.

The transmission coil 210 or 210 and 220 may be attached on the magnetic substrate 59. For example, the magnetic substance may be attached on the substrate, the transmission coil 210 or 210 and 220 may be attached on the magnetic substance, and an insulating layer may be formed on the transmission coil 210 or 210 and 220, but the embodiment is not limited thereto.

Since current flows through the transmission coil 210 or 210 and 220, heat is generated. If such heat is not rapidly exhausted, the heat exerts an influence on the magnetic field induced by the transmission coil 210 or 210 and 220, so that power transferring efficiency may be ultimately deteriorated.

To solve the problem, the heat sink 61 may be disposed between the printed circuit board 65 and the magnetic substance 59. The magnetic substrate 59, the heat sink 61 and the printed circuit substrate 65 may be collectively coupled to each other, but the embodiment is not limited thereto. For example, at least one screw may pass through the magnetic substrate 59 and the heat sink 61 such that the at least one screw is coupled to the printed circuit board 65. For example, the heat sink 61 may be formed of anodized aluminum, but the embodiment is not limited thereto.

The magnetic substrate 59 may make contact with of a top surface of the heat sink 61 and the printed circuit board 65 may make contact with a bottom surface of the heat sink 61. The heat generated from the transmission coil 210 or 210 and 220 may be transferred to the printed circuit board 65 through the heat sink 61. When the heat transferred to the printed circuit board 65 is not rapidly radiated to an outside, the heat may exert an influence on the electronic devices 69 mounted on the printed circuit board.

To this end, at least one thermal pad 73 may be disposed between the electronic device 69 and the inner surface of the second case 75. That is, an adhesive material may be formed on both sides of the thermal pad 73, by which the electronic device 69 may be adhesive to one surface of the thermal pad 73 and the other surface of the thermal pad 73 may be adhesive to the inner surface of the second case 75. Thus, the heat transferred to the printed circuit board 65 may be transferred to the second case 75 through the electronic device 69 and the thermal pad 73, so that the heat may be radiated to an outside.

Nevertheless, when the charging operation is performed for a long time, there may be a limit to the radiation of the heat generated from the transmission coil 210 or 210 and 220 from the printed circuit board 65 to an outside through the thermal pad 73. To solve the above problem, the second case 75 may make contact with the heat sink 61.

The second case 75 may include a protrusion member 77 protruding inward, that is, in the direction close to the guide member 7. The second case 75 may protrude toward the first case 33. The protrusion member 77 may be formed on the printed circuit board 65 corresponding to an opening formed in the printed circuit board 65. For example, since the opening 67 is formed on a central portion of the printed circuit board 65, the protrusion member 77 may be also formed on the central portion of the second case 75. A thickness of the protrusion member 77 may be set by taking into consideration the thicknesses of the printed circuit board 65, the electronic device 69 and a space margin.

A thermal plate 79 may be disposed on a top surface of the protrusion member 77. In addition, the top surface of the protrusion member 77 may include an opening (not shown) and the thermal plate may be installed into the opening. The top surface of the protrusion member 77 may make contact with a rear surface of the heat sink 61 through the opening 67 of the printed circuit board 65. The thermal plate 79 disposed on the protrusion member 77 may make contact with the rear surface of the heat sink 61 through the opening 67 of the printed circuit board 65.

The thermal pad 71 may be disposed between the thermal plate 79 and the heat sink 61 in order to enhance the contact strength between the thermal plate 79 and the heat sink 61 and improve the thermal dissipation efficiency. That is, the heat sink 61 may make stable contact with the thermal plate 79 of the protrusion member 77 by the thermal pad 71. Due to the thermal pad 71, the heat sink 61 is not separated from the thermal plate 79 of the protrusion member 77.

Thus, the heat generated from the transmission coil 210 or 210 and 220 may be transferred to the heat sink 61 and the heat transferred to the heat sink 61 may be transferred to the second case 75 through the printed circuit board 65, the electronic device 69 and the thermal pad 73.

In addition, the heat transferred to the heat sink 61 may be transferred to the thermal plate 79 disposed on the protrusion member 77 of the second case 75 through the thermal pad 71.

Such thermal transferring paths are arranged as follows:

(1) Transmission coil 210 or 210 and 220-->Magnetic substance 59-->Heat sink 61-->Printed circuit board 65-->Electronic device 69-->Thermal pad 73-->Second case 75;

(2) Transmission coil 210 or 210 and 220-->Magnetic substance 59-->Heat sink 61-->Thermal pad 71-->Thermal plate 79.

As described above, according to the embodiment, since the heat of the transmission coil 210 or 210 and 220 is radiated through two paths, the thermal dissipation efficiency may maximized. Due to the maximization of the thermal dissipation efficiency, a magnetic field is stably generated from the transmission coil 210 or 210 and 220, so that the power transferring efficiency may be improved.

The first and second cases 33 and 75 may be coupled to each other by using at least one screw. That is, at least one screw 49 may be coupled to the second case 75 through the coupling hole 47 of the first case 33.

The first and second elastic members 28 and 29 may be fixed to the insides of the second and third recesses 42 and 43 of the secure member 35 through an elastic member coupling member 51. The first and second elastic members 28 and 29 may be fixed into the first and second regions of the elastic member coupling member 51. The elastic member coupling member 51 may be coupled to the secure member 35 by coupling at least one screw 55 to the secure member 35 through the coupling hole 53.

The elastic member coupling member 51 may be detachably attached to the secure member 35. Due to the detachable attachment, if necessary, the first and second elastic members 28 and 29 may be exchanged.

The wireless power receiver 400 according to the embodiment may be installed in a mobile terminal such as a mobile phone, a smart phone, a laptop computer, a digital broadcasting receiver, PDA (Personal Digital Assistants), PMP (Portable Multimedia Player) or a navigation device.

However, it may be easily understood by those skilled in the art that the configuration according to the embodiment is applicable to a fixed terminal such as a digital TV or a desktop computer as well as the mobile terminal.

According to the embodiment, a scheme of transmitting power through electromagnetic induction may signify a tightly coupling scheme having a relatively low Q value, and a scheme of transmitting power through resonance may signify a loosely coupling scheme having a relatively high Q value.

The embodiment provides a supporter capable of maximizing wireless power transmission efficiency.

The embodiment provides a support capable of stably fixing an object.

The embodiment provides a supporter capable of easily detaching an object therefrom.

The embodiment provides capable of maximizing heat radiation efficiency.

According to the embodiment, there is provided a supporter including a housing; a guide member formed at one side of the housing and having an inclined surface; a fixing member facing the guide member to fix an object; and a transmission coil disposed in the housing to wirelessly transmit power.

According to the embodiment, the wireless terminal wirelessly receives power from the transmission coil of the supporter.

According to the embodiment, there are provided following advantages.

First, an object may be safely supported by disposing the guide member of the housing to be inclined.

Secondly, since the fixing member is disposed to connect with the housing such that a pressing pressure is generated toward the guide member of the housing, a part of the object is always pressed while the object is supported, so that the object may be fixed not to be shaken.

Thirdly, the transmission coil is parallel with the inclined guide member, so that the power transmission efficiency of the object may be improved.

Fourthly, the heat sink disposed at the low portion of the transmission coil makes contact with the thermal plate while passing through the printed circuit board, so that the heat generated from the transmission coil may be rapidly radiated to an outside via the heat sink and the thermal plate, thereby improving the radiation efficiency.

Fifthly, the heat sink disposed to the low portion of the transmission coil makes contact with the printed circuit board and the electronic device mounted on the printed circuit board is attached onto the case through thermal pad, so that the heat generated from the transmission coil may be rapidly radiated to an outside through the heat sink, the printed circuit board, the electronic device and the thermal plate, thereby improving the radiation efficiency.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A supporter comprising:
   a housing including a transmission coil to wirelessly transmit power; and
   a fixing member disposed to face a side surface of the housing and fixing a wireless terminal when the wireless terminal is supported,
   wherein the side surface of the housing is disposed to face the transmission coil and support the wireless terminal to stand up,
   wherein the fixing member comprises a first support, a second support, and a pressing part,
   wherein the first support and the second support are branched from the pressing part in a first direction,
   wherein the first support and the second support are spaced apart from each other, and the first support and the second support get closer to each other in a second direction such that an opening is formed by the pressing part, the first support and the second support,
   wherein the first support includes a first upper portion, a first middle portion and a first lower portion of the first support, the first support extends in the first direction from the first upper portion at the pressing part to the first lower portion, and the first middle portion of the first support is between the first upper portion and the first lower portion, and
   the second support includes a second upper portion, a second middle portion and a second lower portion of the second support, the second support extends in the first direction from the second upper portion at the pressing part to the second lower portion, and the second middle portion of the second support is between the second upper portion and the second lower portion,
   wherein a diameter, in a second direction, of the opening between the first middle portion of the first support and the second middle portion of the second support is a first distance, wherein a distance in the second direction between the first lower portion of the first support and the second lower portion of the second support is a second distance, and
   wherein the first distance is greater than the second distance.

2. The supporter of claim 1, wherein at least one portion of the fixing member contacts the side surface of the housing when the wireless terminal is not inserted between the fixing member and the side surface of the housing.

3. The supporter of claim 1, wherein the fixing member moves away from the side surface of the housing when the wireless terminal is inserted between the fixing member and the side surface of the housing.

4. The supporter of claim 1, wherein the fixing member vertically has a round shape.

5. The supporter of claim 1, wherein the fixing member has a convex surface toward the side surface of the housing.

6. The supporter of claim 1, wherein the fixing member comprises an inlet part,
   wherein the first support and the second support are disposed such that the first support and the second support go away from the side surface of the housing in the first direction, and the inlet part is disposed such that the inlet part goes away from the side surface of the housing in an upward direction parallel to the first direction.

7. The supporter of claim 1, wherein the first support, the second support, the pressing part and the inlet part are integrally formed.

8. The supporter of claim 1, further comprising:
   a secure member disposed between the side surface of the housing and the fixing member.

9. The supporter of claim 8, wherein the secure member comprises a first recess having a shape recessed from one side of the secure member toward the side surface of the housing.

10. The supporter of claim 9, wherein a width of the first recess is a third distance, and the second distance is less than the third distance.

11. The supporter of claim 8, wherein the side surface of the housing comprises a guide member having an inclined surface such that the wireless terminal is tilted and supported.

12. The supporter of claim 11, wherein the secure member and the guide member are integrally formed.

13. The supporter of claim 11, wherein the inclined surface is inclined at 5° or greater about a normal line.

14. The supporter of claim 9, wherein the secure member comprises a second recess having a shape recessed downwardly on a side of the first recess.

15. The supporter of claim 1, wherein the fixing member has a restoring force toward the side surface of the housing.

16. The supporter of claim 1, wherein a height of the fixing member is lower than a height of the side surface of the housing.

17. The supporter of claim 1, wherein a width of the fixing member is lower than a width of the side surface of the housing.

18. The supporter of claim 1, wherein the fixing member is moved closer to or away from the side surface of the housing by rotational movement of a rotation shaft.

\* \* \* \* \*